(12) United States Patent
Logan

(10) Patent No.: US 8,122,806 B2
(45) Date of Patent: Feb. 28, 2012

(54) SYSTEM AND APPARATUS FOR MAKING PIPE FENCING

(76) Inventor: Judd Logan, Kirkland, AZ (US)

( * ) Notice: Subject to any disclaimer, the term of this patent is extended or adjusted under 35 U.S.C. 154(b) by 879 days.

(21) Appl. No.: 11/683,746

(22) Filed: Mar. 8, 2007

(65) Prior Publication Data

US 2007/0209205 A1 Sep. 13, 2007

Related U.S. Application Data

(60) Provisional application No. 60/780,790, filed on Mar. 8, 2006.

(51) Int. Cl.
*B60P 3/14* (2006.01)

(52) U.S. Cl. .......................... 83/692; 83/928

(58) Field of Classification Search .................. 83/692, 83/693, 522.11, 522.13, 928
See application file for complete search history.

(56) References Cited

U.S. PATENT DOCUMENTS

| 2,780,870 | A | * | 2/1957 | Clor ................................ 33/640 |
| 3,342,107 | A | * | 9/1967 | Margolien .................... 409/205 |
| 4,562,760 | A | * | 1/1986 | Kinsley .......................... 83/693 |
| 4,745,834 | A | * | 5/1988 | Neumann ....................... 83/468 |
| 4,930,384 | A | * | 6/1990 | Nakatsuji ....................... 83/692 |
| 5,383,698 | A | * | 1/1995 | Buchholz ................... 296/26.03 |
| 5,518,053 | A | * | 5/1996 | Robison .................... 144/286.1 |
| 5,862,584 | A | * | 1/1999 | Manser .......................... 29/560 |
| 7,114,754 | B2 | * | 10/2006 | Morello ..................... 296/24.32 |
| 2005/0172769 | A1 | * | 8/2005 | Maes ................................ 83/54 |

* cited by examiner

*Primary Examiner* — Stephen Choi
(74) *Attorney, Agent, or Firm* — Zeman-Mullen & Ford, LLP

(57) ABSTRACT

A system and apparatus for making pipe fencing which includes a support framework, a power supply mounted on the support framework, a press assembly and pipe notcher mounted on the support framework and connected to the power supply, and a saw mounted on the support framework and connected to the power supply. The apparatus may also include a measuring assembly mounted on the support framework for measuring pipe prior to cutting and a rail member removably attached to the press assembly to support cut pipes while notching the cut pipes.

15 Claims, 14 Drawing Sheets

SYSTEM AND APPARATUS FOR MAKING PIPE FENCING

CROSS-REFERENCE TO RELATED APPLICATIONS

This application claims priority to provisional patent application having Ser. No. 60/780,790 filed Mar. 8, 2006, which is herein incorporated in its entirety.

FIELD OF INVENTION

The present invention relates generally to a system and method for making pipe fencing. More particularly, the present invention relates to a system, method, and apparatus for making pipe fencing that uses a platform for efficiently and effectively measuring, cutting, and notching pipe.

BACKGROUND OF THE INVENTION

In building pipe fences, the ends of some pipes are notched in a semi-circular fashion so that they can be welded to a midsection of another pipe. The ends of the pipes are notched so that their notched ends have a radius that is similar to the radius of the pipe to which they are attached.

Many pipe notching tools exist in the prior art, any of which may be used with the present invention. Examples of pipe notchers include, but are certainly not limited to, those disclosed and described in U.S. Pat. Nos. 5,609,055, 6,435,783 and U.S. Patent Application Publication No. 2004/0226421.

Although a variety of pipe notching tools are used in building pipe fences, the process of building pipe fences is typically tedious and time consuming. Pipes must be measured, cut to their desired length, and then notched on their ends so that they can be horizontally welded to other pipes that are vertically seated in the ground.

Accordingly, there is a need for a system and apparatus that aids in the efficient and effective building of pipe fences while decreasing production time for making pipe fencing.

SUMMARY OF THE INVENTION

The present invention is directed to a system and apparatus for making pipe fencing that includes a support framework, a power supply mounted to the support framework, a press assembly having a pipe notcher mounted on the support framework and connected to the power supply, and a saw mounted on the support framework and connected to the power supply.

In one exemplary embodiment of the invention, a bar member or rail member is removable attached to the press assembly to support a pipe while an end of the pipe is being notched. The embodiment may also include a support brace attached to the rail member to support the rail member at a position that is parallel to the ground at a height of the rail member. In addition, this exemplary embodiment of the invention may include a cylindrical post adjustably mounted along a length of the rail member for supporting and retaining the notched end of a pipe while its opposite end is being notched.

Another exemplary embodiment of the invention includes a measuring assembly mounted to the support framework for measuring a desired pipe length before cutting the pipe. One end of the measuring assembly may include a series of measurements marked along its length and the other end of the measuring assembly may include a flange for supporting and retaining an end of a pipe while cutting the opposite end of the pipe. Both ends of the measuring assembly may be extendable and adjustable in length.

In still another exemplary embodiment of the invention, at least one ramp assembly having a stop post may be mounted to the support framework near a middle of the measuring assembly described above for retaining a plurality of measured and cut pipes prior to notching.

The present invention is also directed to a method for making pipe fencing which includes providing an apparatus having a support framework, a power supply mounted to the support framework, a press assembly having a pipe notcher mounted to the support framework and connected to the power supply, a saw mounted on the support framework and connected to the power supply, and a measuring assembly mounted on the support framework near the saw; measuring a desired length of pipe using the measuring assembly; cutting the pipe at its desired length using the saw; notching at least one end of the cut pipe using the press assembly and pipe notcher; and welding the notched end of the pipe to a midsection of another pipe.

Another exemplary embodiment of the method for making pipe fencing of the present invention may include the steps of first providing a separate measuring tool and using the measuring tool to measure a length of horizontal pipe needed between two vertically seated pipes.

The present invention also includes a tool for measuring a length of pipe for building pipe fencing which includes a first hollow tubular member, a measuring bar slidably engaged within one end of the first hollow tubular member, and a second tubular member slidably engaged within the other end of the hollow tubular member. The second tubular member may be spring loaded within the first hollow tubular member.

BRIEF DESCRIPTION OF THE DRAWINGS

The present invention is hereafter described in conjunction with the following drawing figures, wherein like numerals demote like elements, and.

DETAILED DESCRIPTION

The following description is of exemplary embodiments of the invention only, and is not intended to limit the scope, applicability or configuration of the invention in any way. Rather, the following description is intended to provide a convenient illustration for implementing various embodiments of the invention. As will become apparent, various changes may be made in the function and arrangement of the elements described in these embodiments without departing from the scope of the invention set forth in the appended claims. For example, in the context of the present invention, many of the elements included in the system and apparatus for making pipe fencing described herein may be mounted in various locations on the support framework and many of the elements themselves may comprise a number of embodiments. For example, the power supply of the present invention may comprise a generator or an engine and the press assembly may comprise a mechanical press assembly or a hydraulic press assembly.

In general, the present invention provides a system and apparatus for making pipe fencing, as discussed in further detail below. The system and apparatus includes a support framework, a power supply mounted on the support framework, a press assembly having a pipe notcher mounted on the support framework and connected to the power supply, and a saw mounted on the support framework and connected to the power supply. The apparatus may include additional elements as described in more detail below with respect to the various exemplary embodiments.

Figure 1:
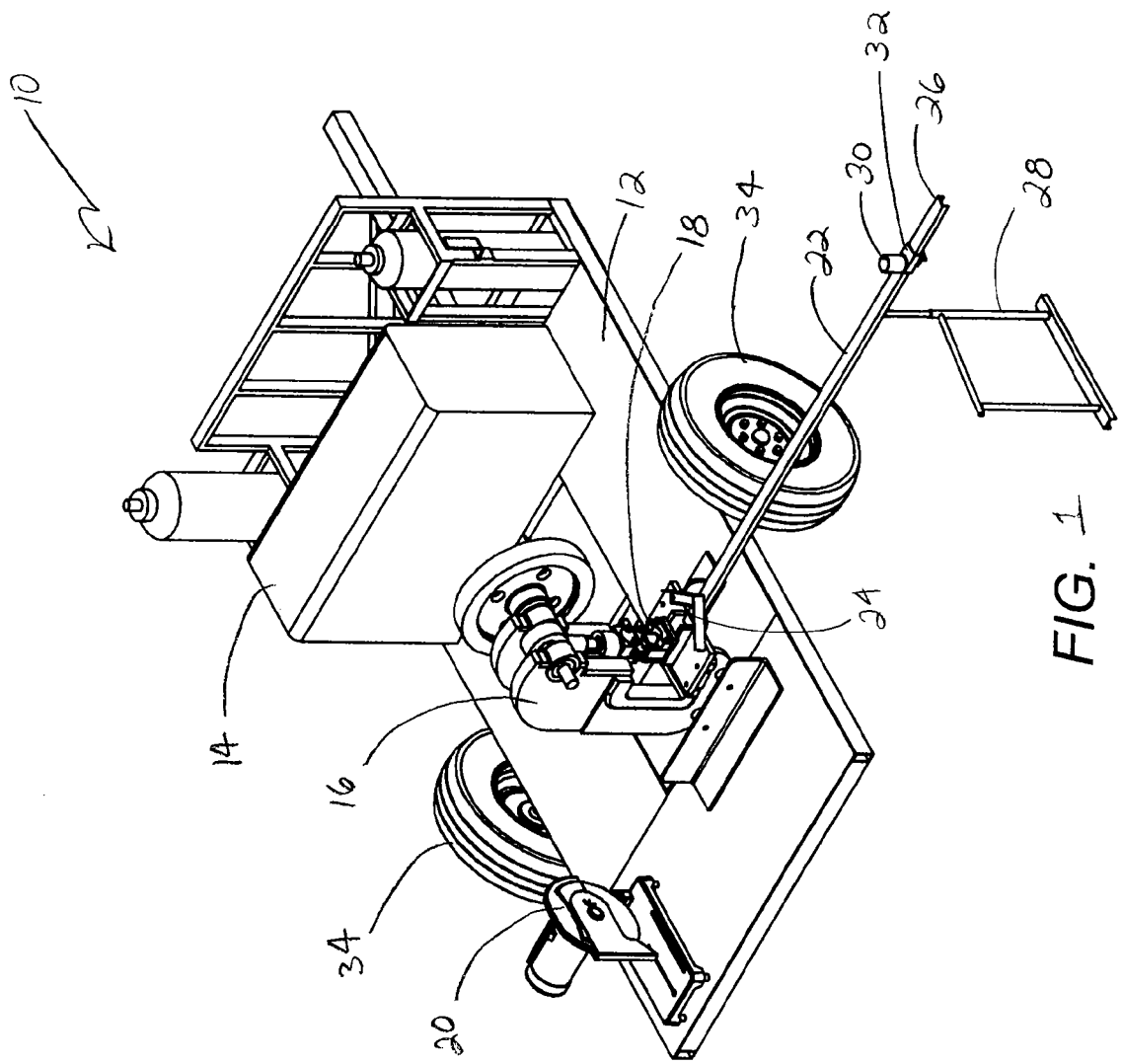
FIG. 1 is a perspective view of one exemplary embodiment of the apparatus of the present invention for making pipe fencing.

Turning now to the figures, FIG. 1 illustrates a perspective view of one exemplary embodiment of the apparatus 10 for making pipe fencing in accordance with the present invention. The apparatus 10 includes a support framework 12, a power supply 14 mounted on support framework 12, a press assembly 16 having a pipe notcher 18 wherein the press assembly 16 is mounted on support framework 12 and connected to power supply 14, and a saw 20 mounted on support framework 12 and connected to power supply 14. The exemplary embodiment shown in FIG. 1 also includes a rail member 22 having a first end 24 and a second end 26 with the first end 24 removably attached to press assembly 16 and the second end 26 held up by support brace 28 so that rail member 22 is positioned parallel to the ground at a height equal to press assembly 16. Rail member 22 functions to support a pipe while the pipe is notched at either of its ends. The embodiment shown in FIG. 1 also includes a post 30 mounted on rail member 22 near second end 26 of rail member 22 for supporting and retaining a notched end of a pipe while the pipe is being notched at its opposite end. Post 30 may be adjustable along a length of rail member 22 by any number of means including, but not limited to, attaching post 30 to a sliding bracket 32.

Support framework 12 preferably comprises a portable platform or a portable trailer bed having at least one wheel 34 for transporting the apparatus 10 from one location to another location. Support framework 12 is preferably comprised of a solid, durable, strong material, such as a metal, for example, which is capable of supporting all of the elements mounted on support framework 12, many of which are heavy.

Press assembly 16 shown in FIG. 1 is a mechanical press assembly which engages pipe notcher 18 to notch the ends of pipes which are used to form pipe fencing. Press assembly 16 may comprise any type of press assembly that is capable of engaging and employing pipe notcher 18 such that it cuts into metal pipes thereby notching the ends of the pipes. In addition, saw 20 may comprise any type of saw capable of cutting through metal pipe. Power supply 14 may comprise an engine, a generator, or any other means of supplying power that is capable of supplying a sufficient amount of power to operate press assembly 16 and saw 20.

Rail member 22 and support brace 28 are preferably comprised of a solid and durable material capable of supporting a pipe that is being notched at either of its ends. Examples include, but are not limited to, metal, polymers, fiberglass, and any other composition capable of supporting a metal pipe. In addition, support brace 28 is removably connected to rail member 22 which is removably connected to press assembly 16 so that they can be easily stored on support framework 12 during transport.

Figure 2:
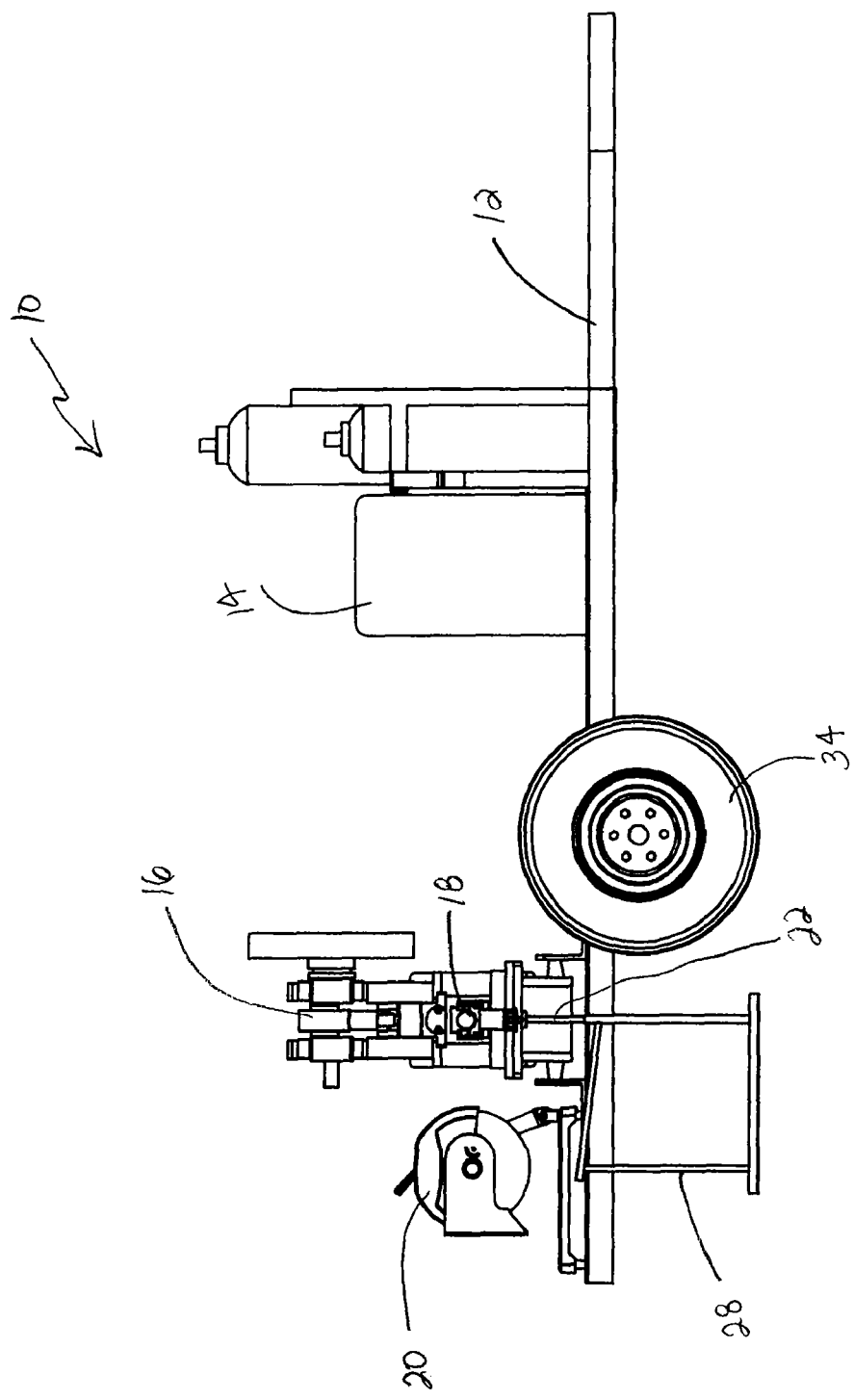
FIG. 2 is a side elevational view of the exemplary embodiment shown in FIG. 1.
Figure 3:
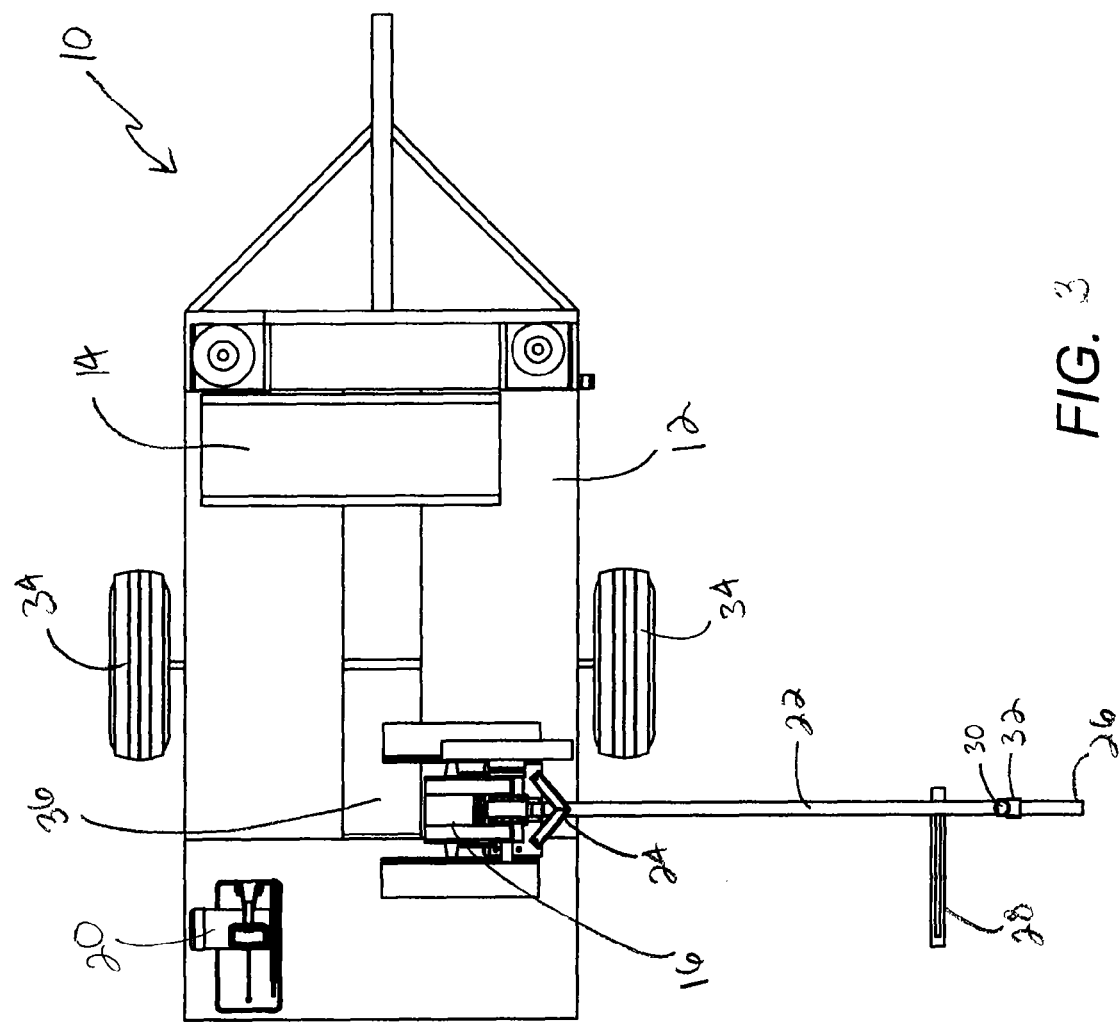
FIG. 3 is a top plan view of the exemplary embodiment shown in FIG. 1.
Figure 4:
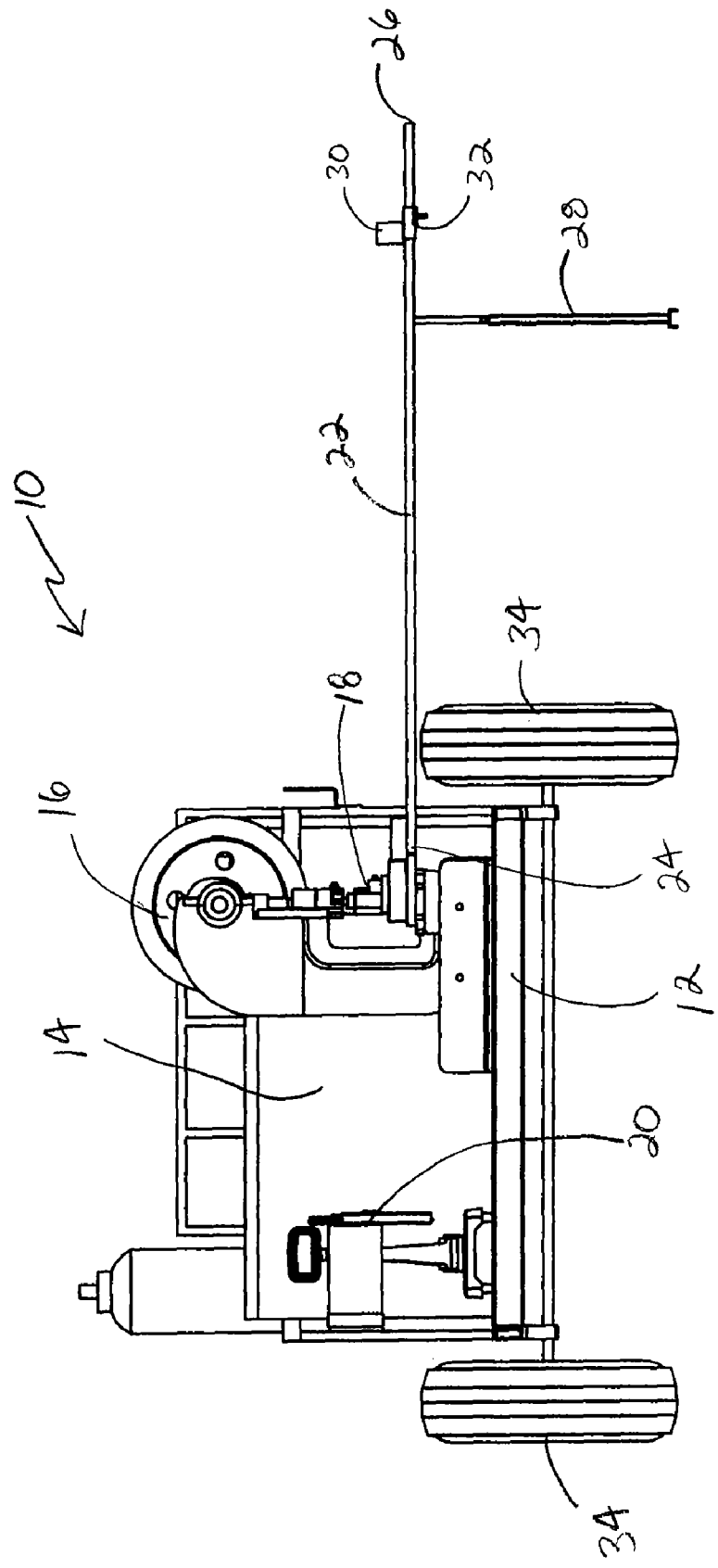
FIG. 4 is a rear elevational view of the exemplary embodiment shown in FIG. 1.
Figure 5:
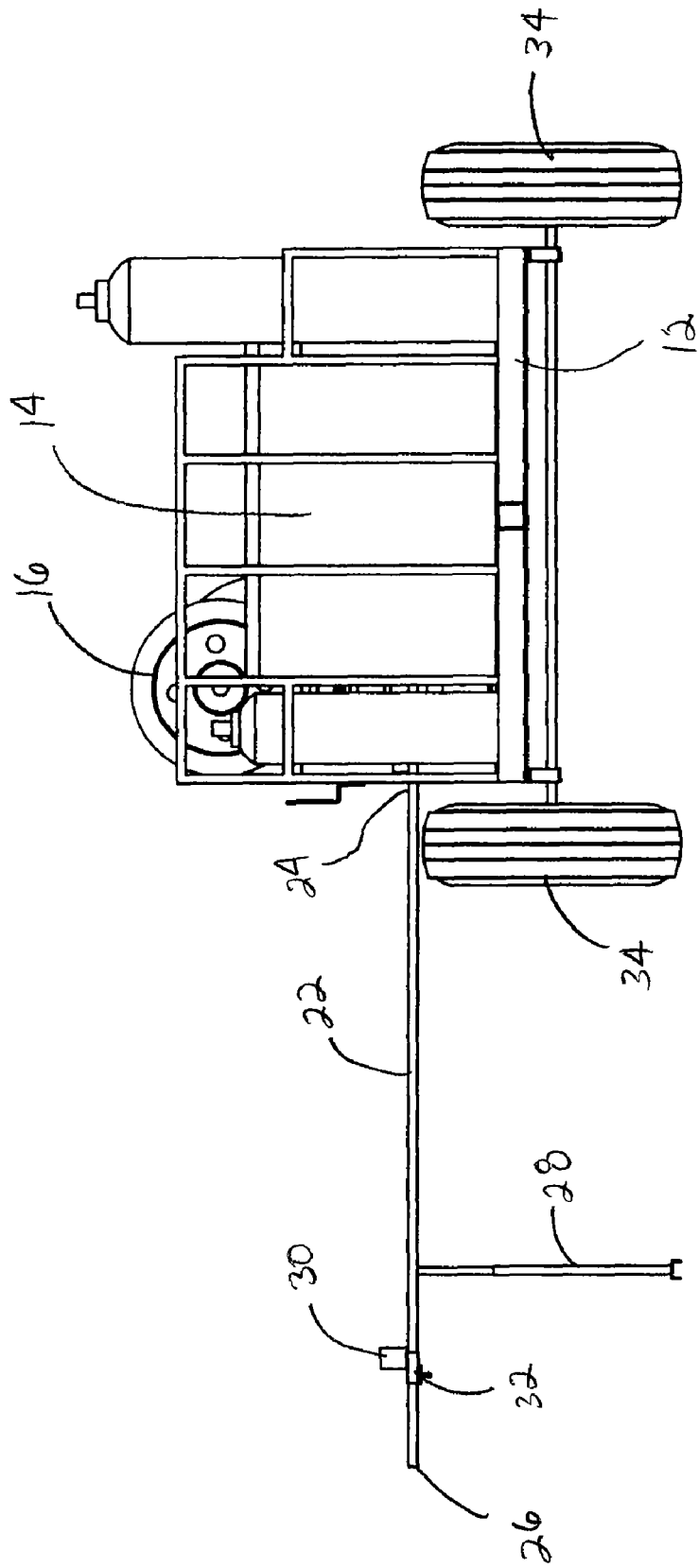
FIG. 5 is a front elevational view of the exemplary embodiment shown in FIG. 1.

FIG. 2 is a side elevational view of the exemplary embodiment of the apparatus of the present invention for making pipe fencing shown in FIG. 1. As shown in FIG. 2, press assembly 16, including pipe notcher 18, and saw 20 are mounted near the rear end of support framework 12 while power supply 14 is mounted near the front end of support framework 12. FIG. 3 shows a top planar view of the exemplary embodiment shown in FIGS. 1 and 2. FIG. 3 also shows positioning of power supply 14, press assembly 16, including pipe notcher 18, and saw 20 on support framework 12. Support framework 12 may also include one or more openings 36 for easily accessing and repairing elements of the invention such as power supply 14 and press assembly 16. FIGS. 4 and 5 show rear and front elevational views, respectively, of the exemplary embodiment of the apparatus for making pipe fencing shown in FIG. 1.

Figure 6:
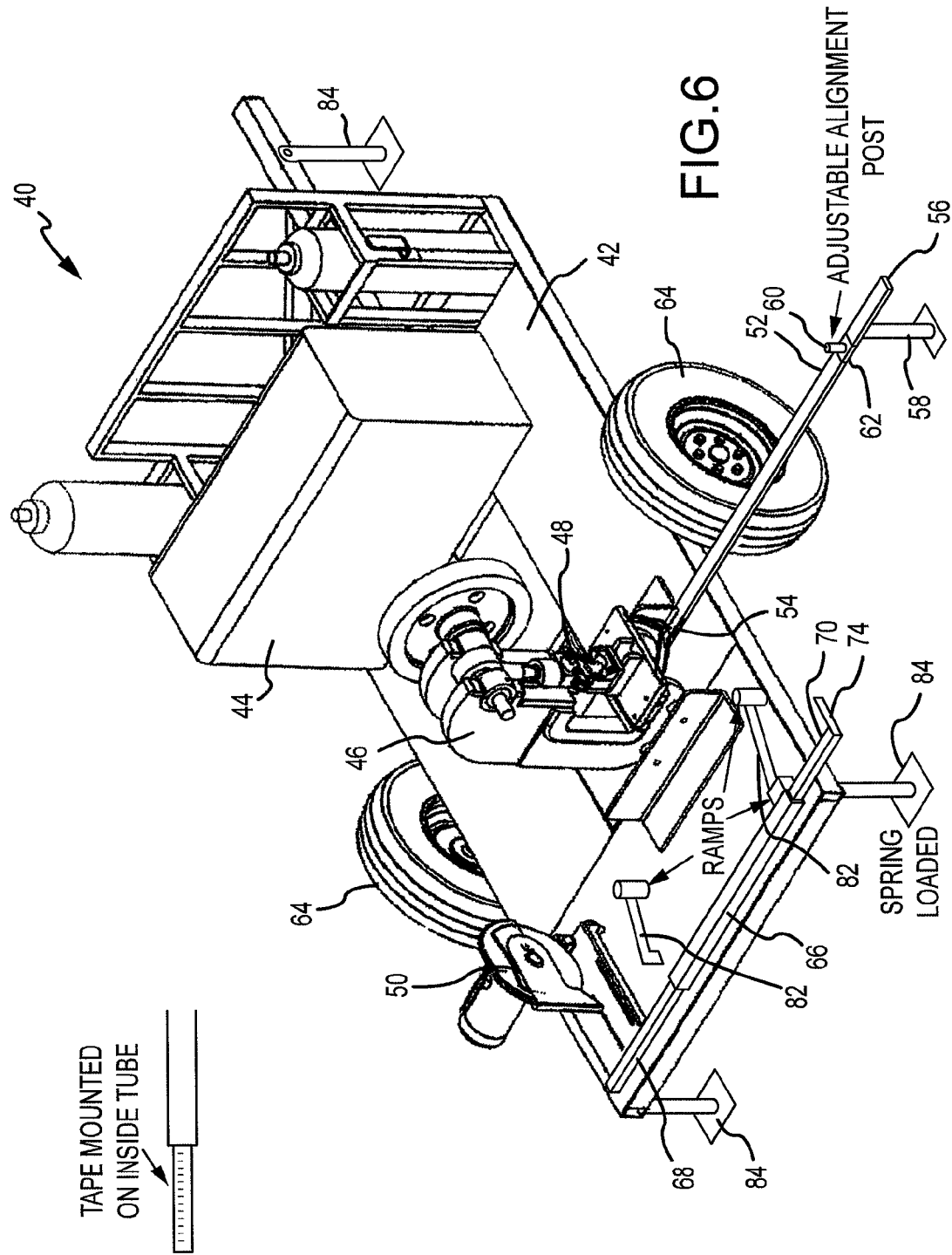
FIG. 6 is a perspective view of another exemplary embodiment of the apparatus of the present invention for making pipe fencing.

FIG. 6 is a perspective view of another exemplary embodiment of the apparatus 40 of the present invention for making pipe fencing. Like the embodiment shown in FIG. 1, apparatus 40 includes support framework 42, power supply 44 mounted on support framework 42, press assembly 46 having pipe notcher 48 mounted on support framework 42 and connected to power supply 44, and saw 50 mounted on support framework 42 and connected to power supply 44. Like the embodiment shown in FIG. 1, apparatus 40 also includes rail member 52 having first end 54 removably attached to press assembly 46 and second end 56 supported by support brace 58. Post 60 is attached to, and adjustable along a length of, rail member 52 via sliding bracket 62. However, unlike the embodiment shown in FIG. 1, apparatus 40 shown in FIG. 6 also includes a measuring assembly 66 having a first end 68 which includes a series of measurements 72 (see FIG. 7) contained thereon and a second end 70 which includes a flange 74 for supporting and retaining an end of a pipe that is being cut. Measuring assembly 66 is used to measure a desired length of pipe before cutting the pipe with saw 50. Apparatus 40 also includes one or more ramp assemblies 82 which may function to retain pieces of pipe after they are cut with saw 50. In addition, ramp assemblies 82 may also function to provide additional support to a pipe while being measured with measuring assembly 66 and cut with saw 50.

Figure 7:
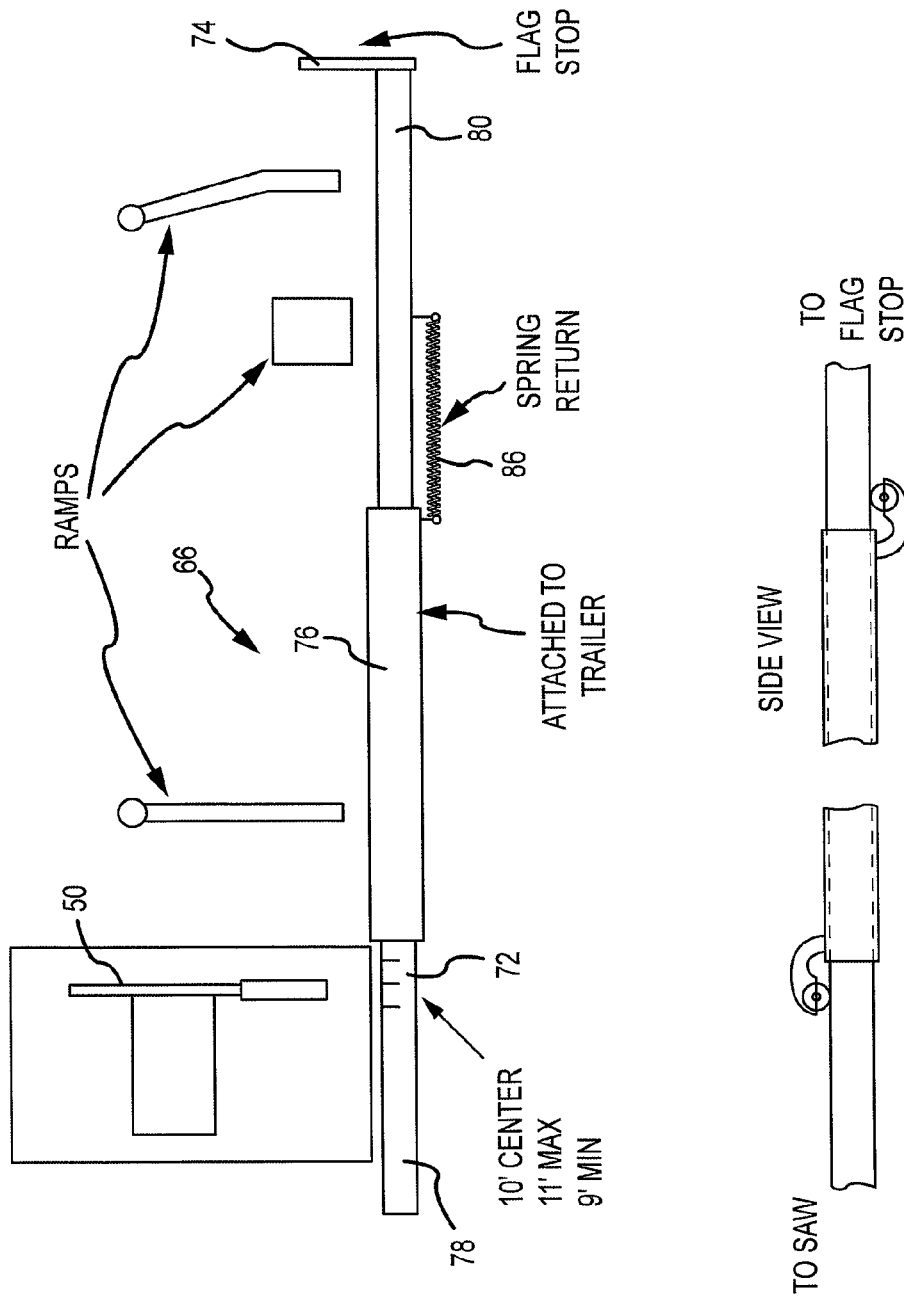
FIG. 7 is a top plan view of the measuring assembly and saw of the exemplary embodiment shown in FIG. 6.

A top plan view of the measuring assembly and saw of the exemplary embodiment shown in FIG. 6 is illustrated in FIG. 7. Measuring assembly 66 includes a stationary or a static member 76, a first moveable member 78 contained within one end of static member 76, and a second moveable member 80 contained within the opposite end of static member 76. First moveable member 78 is extendable from an end of static member 76 and includes a series of measurements 72 contained thereon for measuring a desired length of pipe. Second moveable member 80 is extendable from an opposite end of static member 76 and is preferably contained within static member 76 via a spring mechanism 86. Second moveable member 80 also includes a flange 74 for supporting and retaining an end of a pipe that is being cut with saw 50.

Figure 8:
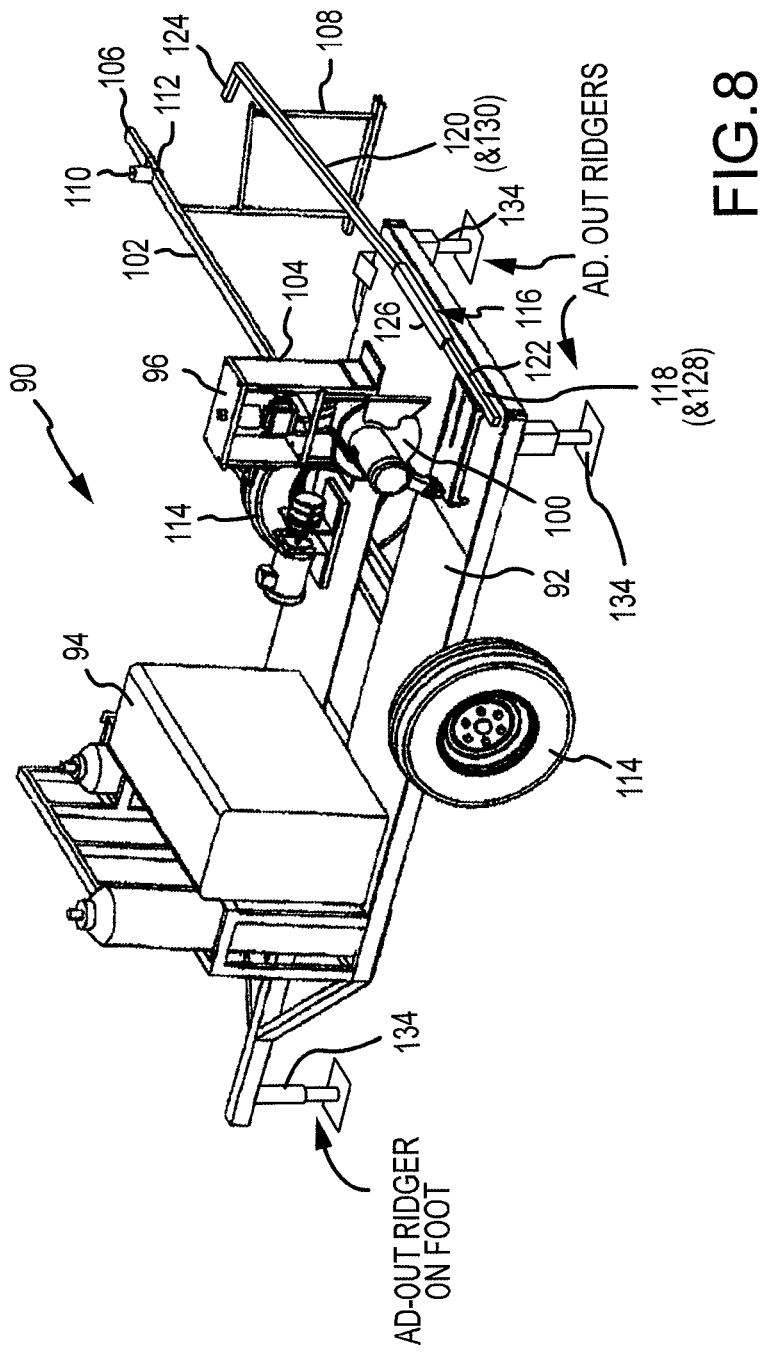
FIG. 8 is a perspective view of a third exemplary embodiment of the apparatus of the present invention for making pipe fencing.

A perspective view of a third exemplary embodiment of the apparatus 90 for making pipe fencing is shown in FIG. 8. Like the apparatus shown in FIG. 6, apparatus 90 shown in FIG. 8 includes a support framework 92, power supply 94 mounted on support framework 92, press assembly 96 having a pipe notcher 98 mounted on support framework 92 and connected to power supply 94, and a saw 100 mounted on support framework 92 and connected to power supply 94. Apparatus 90 also includes rail member 102 having a first end 104 and second end 106 where first end 104 is removably attached to press assembly 96 and second end 106 is supported by support brace 108. Rail member 102 also includes a post 110 adjustable along a length of rail member 102 via sliding bracket 112. Apparatus 90 also includes measuring assembly 116 having a first end 118 which includes a series of measurements 122 contained thereon and a second end 120 which includes a flange 124 for supporting and retaining an end of a pipe that is being cut. Measuring assembly 116 is used to measure a desired length of pipe before cutting the pipe with saw 100. More particularly, measuring assembly 116 includes a stationary or a static member 126, a first moveable member 128 contained within one end of static member 126, and a second moveable member 130 contained within the opposite end of static member 126. First moveable member 128 is extendable from an end of static member 126 and includes a series of measurements 122 contained thereon for measuring a desired length of pipe. Second moveable member 130 is extendable from an opposite end of static member 126 and is preferably contained within static member 126 via a spring mechanism. Second moveable member 130 also includes a flange 124 for supporting and retaining an end of a pipe that is being cut with saw 100. However, unlike the embodiment shown in FIG. 6, the embodiment of the apparatus 90 shown in FIG. 8 includes a hydraulic press 96 instead of a mechanical press assembly.

Figure 9:
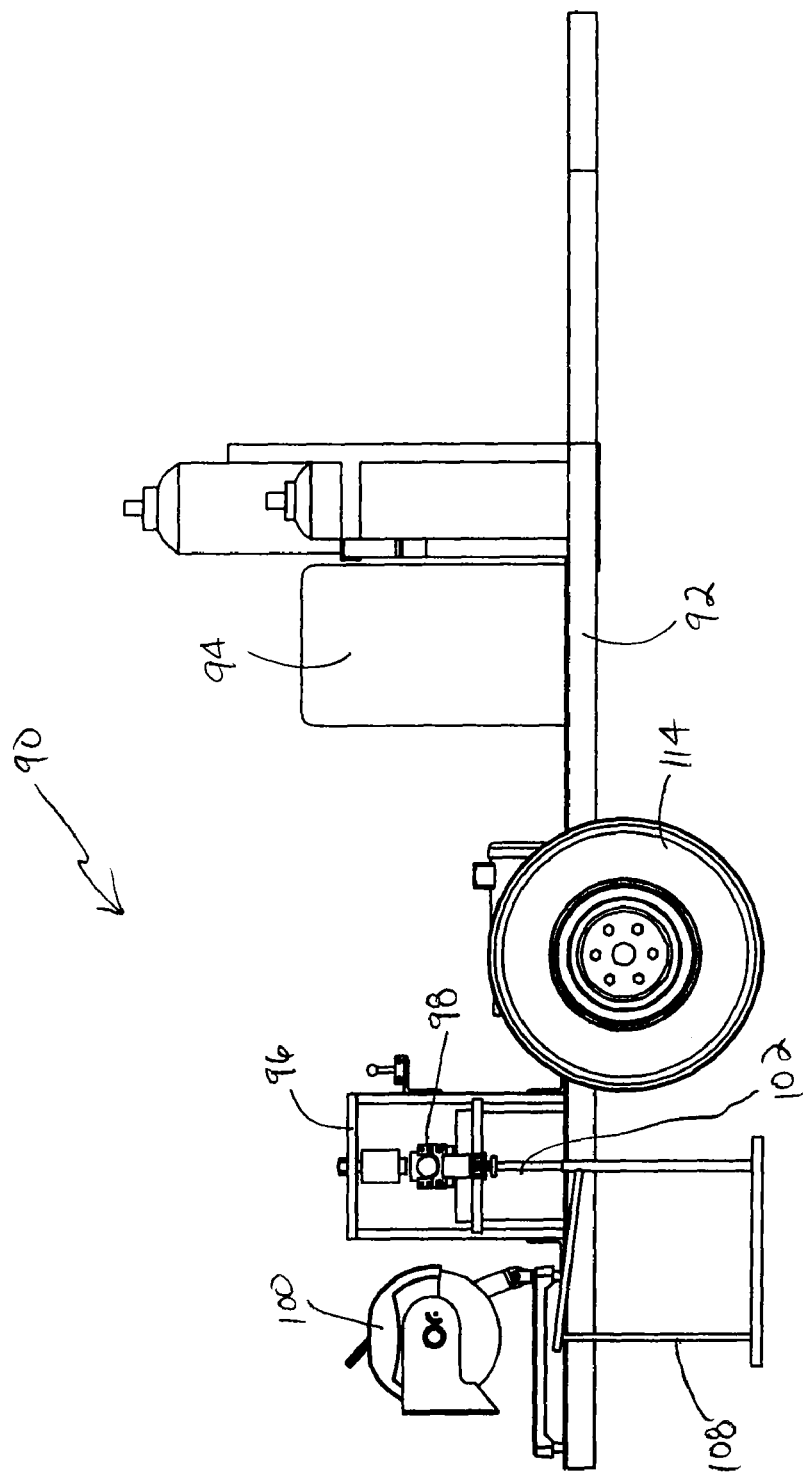
FIG. 9 is a side elevational view of the exemplary embodiment show in FIG. 8.
Figure 10:
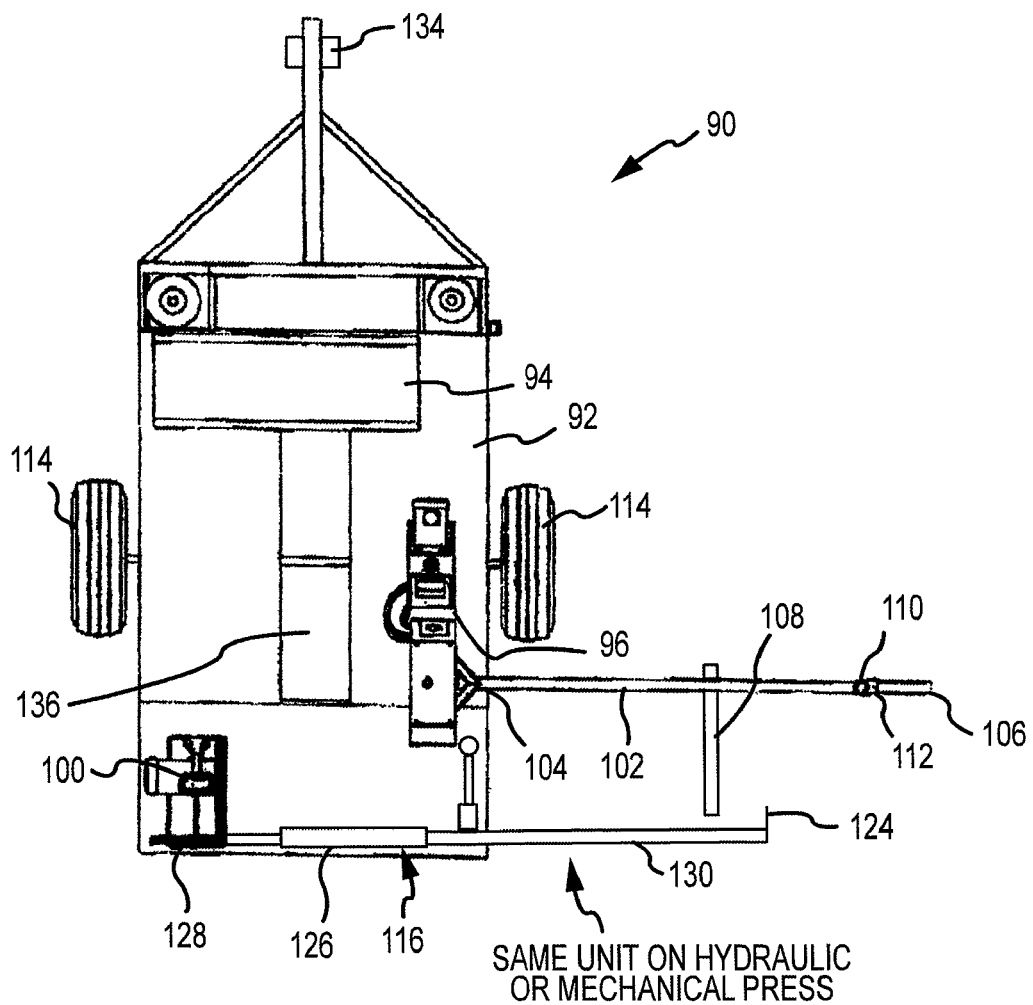
FIG. 10 is a top planar view of the exemplary embodiment shown in FIG. 8.
Figure 11:
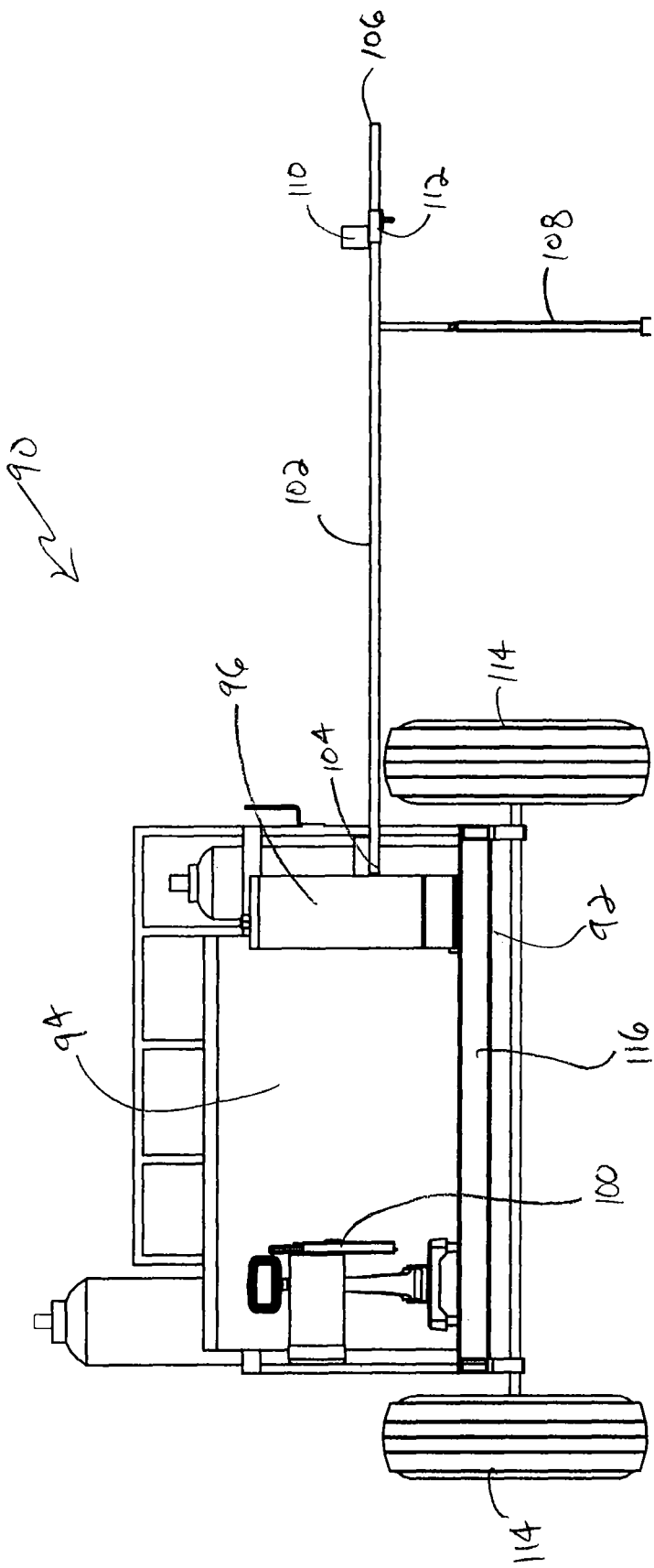
FIG. 11 is a rear elevational view of the exemplary embodiment shown in FIG. 8.
Figure 12:
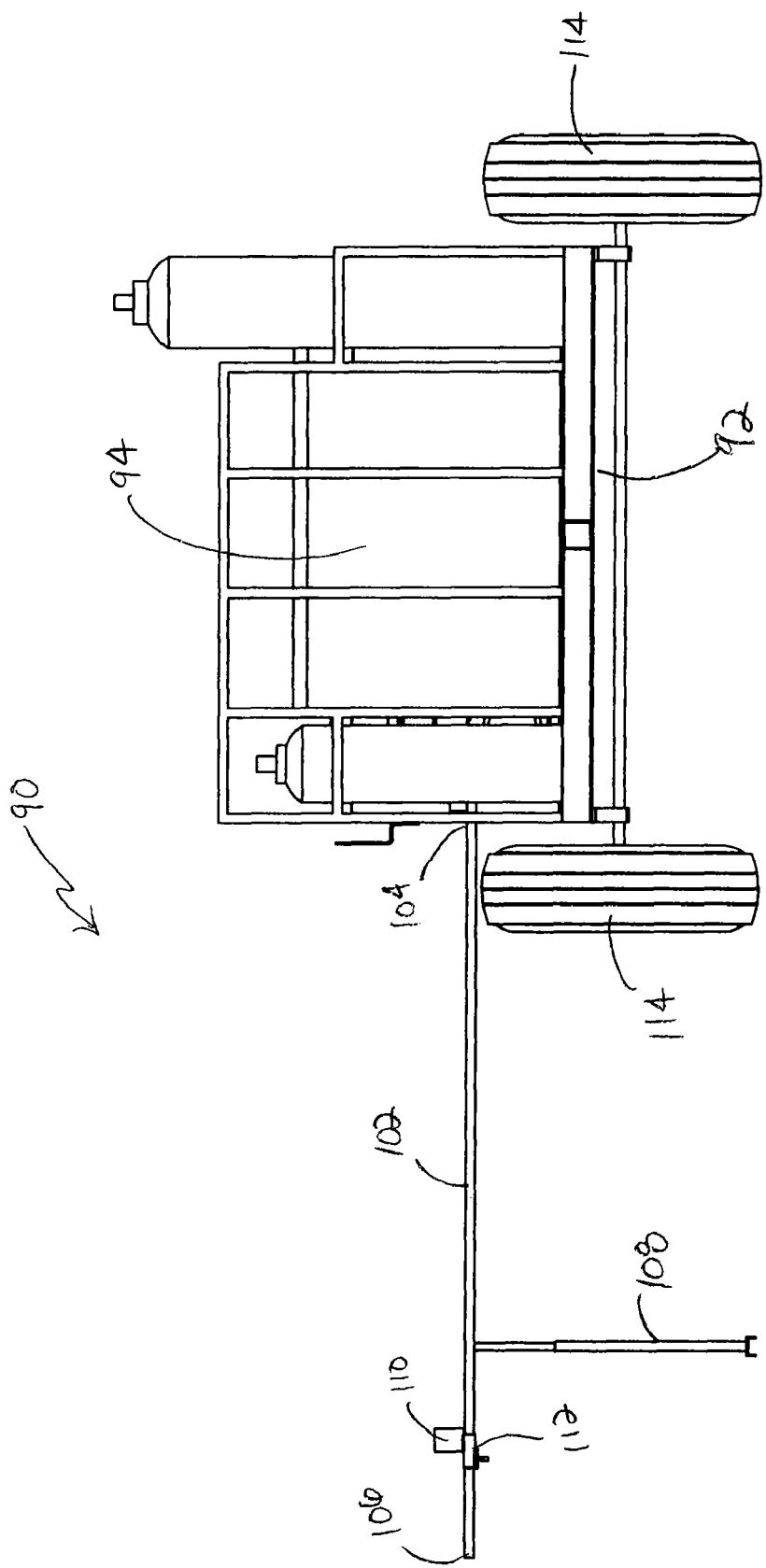
FIG. 12 is a front elevational view of the exemplary embodiment shown in FIG. 8.

FIG. 9 is a side elevational view of the exemplary embodiment of the apparatus of the present invention for making pipe fencing shown in FIG. 8. As shown in FIG. 9, press assembly 96, including pipe notcher 98, and saw 100 are mounted near the rear end of support framework 92 while power supply 94 is mounted near the front end of support framework 92. FIG. 10 shows a top planar view of the exemplary embodiment shown in FIGS. 8 and 9. FIG. 10 also shows positioning of power supply 94, press assembly 96, including pipe notcher 98, saw 100, measuring assembly 166 (and its component parts), and rail member 102 (and its related parts) on support framework 92. Support framework 92 may also include one or more openings 136 for easily accessing and repairing elements of the invention such as power supply 94 and press assembly 96. FIGS. 11 and 12 show rear and front elevational views, respectively, of the exemplary embodiment of the apparatus for making pipe fencing shown in FIG. 8. A welding tool (not shown) may also be removably mounted on support framework 92 and connected to power supply 94.

Figure 13:
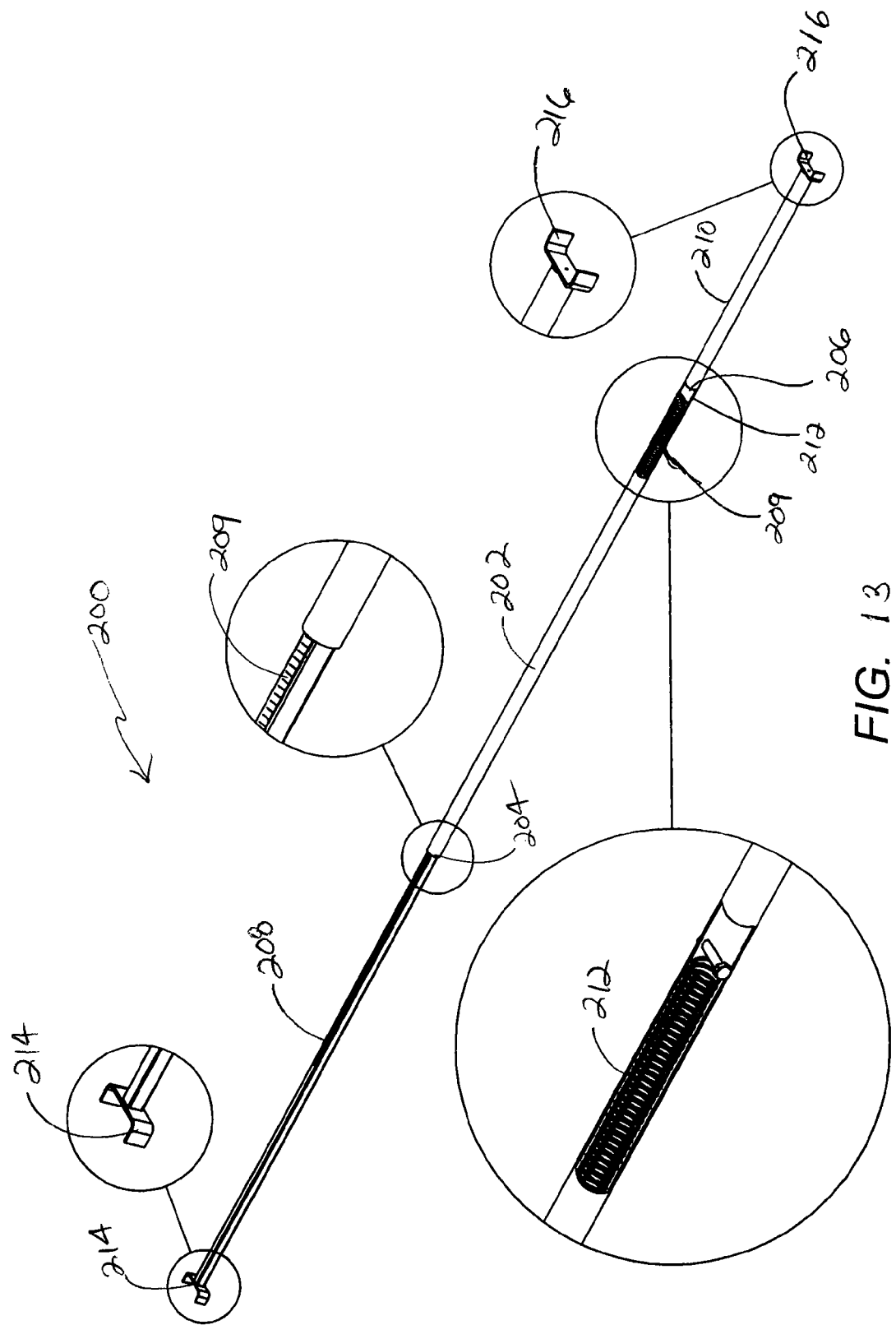
FIG. 13 is a perspective view of the measuring tool of the present invention for measuring a length of pipe for building pipe fencing.
Figure 14:
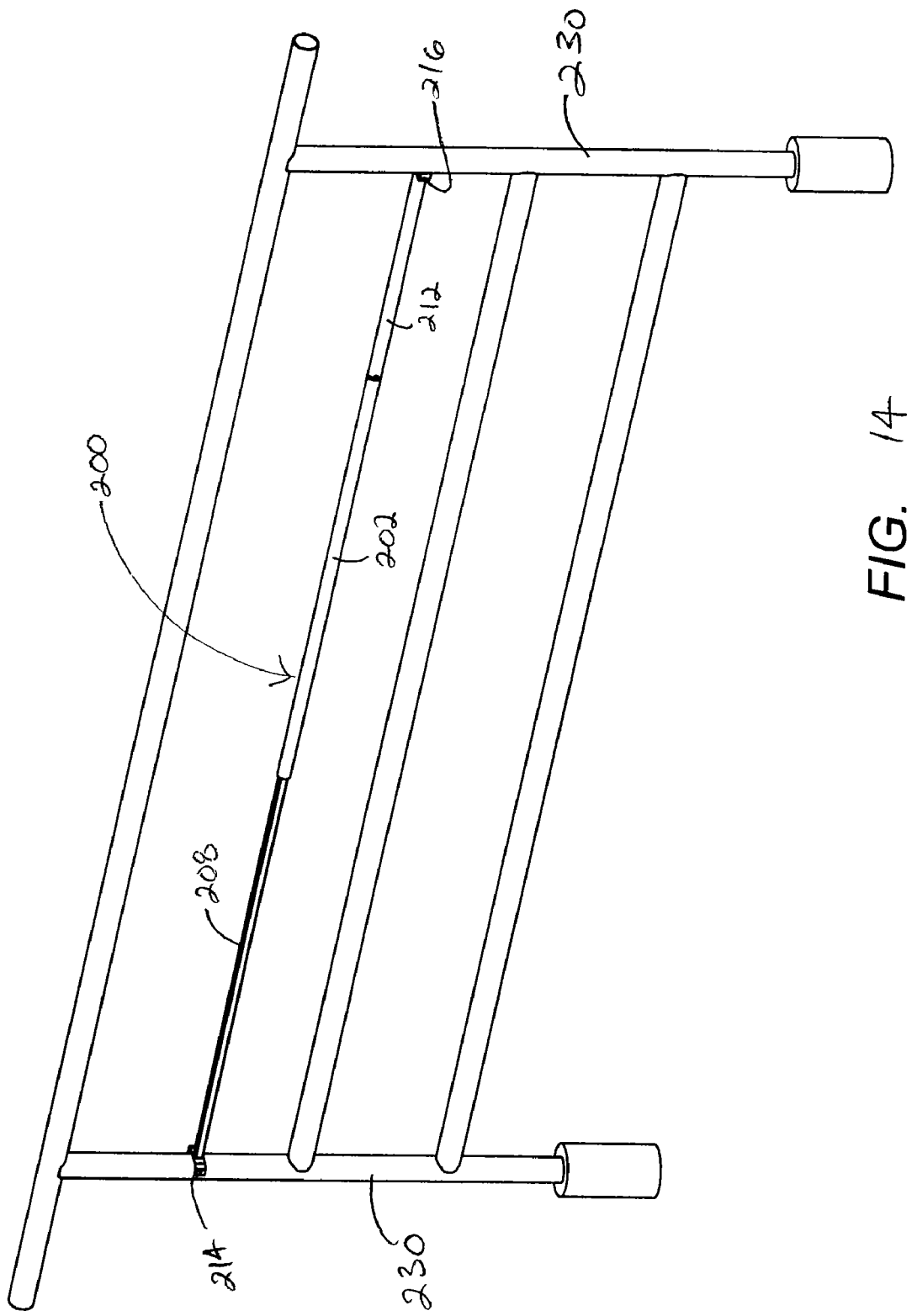
FIG. 14 is a perspective view showing the measuring tool shown in FIG. 13 being used to measure a length of pipe needed for pipe fencing.

Turning now to FIG. 13 a perspective view of the measuring tool 200 for measuring a length of pipe when building pipe fencing is shown. Measuring tool 200 includes a first hollow tubular member 202 having a first end 204 and a second end 206, a measuring bar 208 slidably engaged within first end 204 of hollow tubular member 202 and a second tubular member 210 slidably engaged within a second end 206 of first hollow tubular member 202. Measuring bar 208 includes a series of measurements 209 contained thereon for measuring a length of pipe. Second tubular member 210 is preferably contained within second end 206 of first hollow tubular member 202 via a spring mechanism 212. A first bracket 214 is attached to an end of measuring bar 208 located opposite first end 204 of first hollow tubular 202 and a second bracket 216 is attached to an end of second tubular member 210 opposite second end 206 of first hollow tubular member 202. In use, brackets 214 and 216 are positioned between vertically seated bar members 230 (shown in FIG. 14) so that an exact measurement can be taken for the length of pipe needed to be welded between vertically seated bar members 230 to form a pipe fence.

The apparatus for making pipe fencing described in the various embodiments of the specification along with measuring tool 200 provide users with an efficient and effective method for making pipe fencing which decreases production time. The method for making pipe fencing includes the steps of: 1) providing an apparatus having a support framework, a power supply mounted on the support framework, a press assembly having a pipe notcher mounted on the support framework and connected to the power supply, a saw mounted on the support framework and connected to the power supply, and a measuring assembly mounted on the support framework near the saw, 2) measuring a desired length of pipe using the measuring assembly, 3) cutting the pipe at its desired length using the saw, 4) notching at least one end of the cut pipe using the press assembly and pipe notcher, and 5) welding the notched end of the pipe to the midsection of another pipe. The method for making pipe fencing may also include the steps of providing a measuring tool having a first hollow tubular member, a measuring bar slidably engaged within one end of the hollow tubular member, and a second tubular member slidably engaged within the other end of the first hollow tubular member; and using the measuring tool to measure a length of horizontal pipe needed between two vertically seated pipes.

It will be understood by those skilled in the art that the steps and the method described may vary yet still produce the same result of efficiently and effectively making a pipe fence. Many modifications and other embodiments of the invention set forth herein will come to mind to one skilled in the art to which this invention pertains having the benefit of the teachings presented in the foregoing descriptions and the associated drawings. Therefore, it needs to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An apparatus for making pipe fencing comprising:
   a support framework;
   a power supply mounted on the support framework;
   a press assembly having a pipe notcher wherein the press assembly is mounted on the support framework and connected to the power supply;
   at least one rail member having first and second ends wherein the first end is removably attached to the press assembly to support a pipe while notching an end of the pipe; and
   a saw mounted on the support framework and connected to the power supply.

2. The apparatus of claim 1 further comprising at least one measuring assembly having first and second opposite ends wherein the measuring assembly is mounted on the support framework near the saw for measuring a desired pipe length prior to cutting the pipe.

3. The apparatus of claim 2 further comprising at least one ramp assembly having a stop post mounted to the support frame near a middle section of the measuring assembly for retaining a plurality of measured and cut pipe pieces prior to notching.

4. The apparatus of claim 2 wherein the first end of the measuring assembly includes a series of measurements thereon for measuring a desired length of pipe.

5. The apparatus of claim 4 wherein the first end of the measuring assembly is extendable and adjustable in length.

6. The apparatus of claim 4 wherein the second end of the measuring assembly includes a flange attached thereto for retaining an end of a pipe.

7. The apparatus of claim 6 wherein the second end of the measuring assembly is extendable and adjustable in length.

8. The apparatus of claim 1 further comprising a support brace attached to the second end of the rail member.

9. The apparatus of claim 8 further comprising a post mounted on the rail member near a second end of the rail member for supporting a notched end of a pipe while notching an opposite end of the pipe.

10. The apparatus of claim 9 wherein the post is adjustable along a length of the rail member.

11. The apparatus of claim 1 wherein the power supply comprises an engine or a generator.

12. The apparatus of claim 1 wherein the press assembly is a mechanical press or a hydraulic press.

13. The apparatus of claim 1 wherein the support framework comprises a portable platform or a portable trailer bed.

14. The apparatus of claim 13 wherein the support framework comprises at least one wheel for transporting the apparatus from one location to another location.

15. The apparatus of claim 14 wherein the support framework further comprises at least one support brace for maintaining the apparatus in a fixed position while cutting and notching pieces of pipe.

* * * * *